(12) United States Patent
Koetting et al.

(10) Patent No.: US 8,163,412 B2
(45) Date of Patent: Apr. 24, 2012

(54) BATTERY CELL INTERCONNECT AND VOLTAGE SENSING ASSEMBLY AND METHOD FOR COUPLING A BATTERY CELL ASSEMBLY THERETO

(75) Inventors: William Koetting, Davisburg, MI (US); Kwok Tom, Madison Heights, MI (US); David C. Robertson, Royal Oak, MI (US); Heekook Yang, Ontario (CA); Martin J. Klein, Grosse Pointe Park, MI (US)

(73) Assignee: LG Chem, Ltd. (KR)

( * ) Notice: Subject to any disclaimer, the term of this patent is extended or adjusted under 35 U.S.C. 154(b) by 968 days.

(21) Appl. No.: 12/164,878

(22) Filed: Jun. 30, 2008

(65) Prior Publication Data

US 2009/0325042 A1  Dec. 31, 2009

(51) Int. Cl.
*H01M 10/48* (2006.01)
(52) U.S. Cl. ............ 429/90; 429/151; 429/161; 429/170
(58) Field of Classification Search .................... 429/90, 429/151, 161, 170
See application file for complete search history.

(56) References Cited

U.S. PATENT DOCUMENTS

| | | | |
|---|---|---|---|
| 4,951,385 A | 8/1990 | DeSanto | |
| 5,382,480 A | 1/1995 | Molyneux | |
| 5,850,909 A | 12/1998 | Wagner | |
| 5,854,580 A | 12/1998 | Konda et al. | |
| 6,081,049 A | 6/2000 | Simmons | |
| 6,333,846 B1 | 12/2001 | Hashizawa et al. | |
| 6,459,558 B1 | 10/2002 | Hashizawa et al. | |
| 7,077,704 B2 | 7/2006 | Ikeda et al. | |
| 7,091,878 B2 | 8/2006 | Holle et al. | |
| 7,270,576 B2 | 9/2007 | Kim et al. | |
| 7,294,020 B2 | 11/2007 | Zhao et al. | |
| 7,362,232 B2 | 4/2008 | Holle et al. | |
| 7,545,135 B2 | 6/2009 | Holle et al. | |
| 7,563,137 B1 | 7/2009 | Koetting et al. | |
| 7,578,702 B1 | 8/2009 | Tom et al. | |
| 2003/0213121 A1 | 11/2003 | Rouilolard et al. | |
| 2005/0130033 A1 | 6/2005 | Iwamura et al. | |
| 2006/0194101 A1 | 8/2006 | Ha et al. | |
| 2006/0234558 A1 | 10/2006 | Li | |
| 2007/0238018 A1* | 10/2007 | Lee et al. | 429/159 |
| 2008/0124617 A1 | 5/2008 | Bjork | |
| 2009/0033453 A1 | 2/2009 | Deno et al. | |

(Continued)

FOREIGN PATENT DOCUMENTS

EP  1089373 A1  4/2001

(Continued)

OTHER PUBLICATIONS

International Search Report for International application No. PCT/KR2009/003438 dated Jan. 22, 2010.

(Continued)

*Primary Examiner* — Jane Rhee
(74) *Attorney, Agent, or Firm* — Cantor Colburn LLP

(57) ABSTRACT

A battery cell interconnect and voltage sensing assembly and a method for coupling a battery cell assembly thereto are provided. The battery cell interconnect and voltage sensing assembly includes a frame member holding a plurality of electrical interconnect members and a circuit board with an electrical connector. The assembly routes an electrical current from battery cell assemblies through the electrical interconnect members and can allow a voltage at each of the electrical interconnect members to be sensed at the electrical connector.

5 Claims, 9 Drawing Sheets

U.S. PATENT DOCUMENTS

2009/0323293 A1 12/2009 Koetting et al.
2010/0271168 A1 10/2010 Niedzwiecki et al.

FOREIGN PATENT DOCUMENTS

| JP | 2007103238 A | 4/2007 |
|---|---|---|
| KR | 20080027504 A | 3/2008 |
| WO | WO00/30190 A1 | 5/2000 |

OTHER PUBLICATIONS

International Search Report for International application No. PCT/KR2009/003440 dated Jan. 22, 2010.

International Search Report for International application No. PCT/KR2010/002332 dated Oct. 29, 2010.

\* cited by examiner

BATTERY CELL INTERCONNECT AND VOLTAGE SENSING ASSEMBLY AND METHOD FOR COUPLING A BATTERY CELL ASSEMBLY THERETO

TECHNICAL FIELD

This application relates generally to a battery cell interconnect and voltage sensing assembly and a method for coupling a battery cell assembly to the battery cell interconnect and voltage sensing assembly.

BACKGROUND OF THE INVENTION

Battery packs generally have a plurality of battery cells. During manufacture, electrodes on the battery cells can be bent toward each other and then mechanically fastened together utilizing a mechanical fastener. A problem associated with this methodology is that the electrodes are not mechanically supported which can cause the electrodes to bend and become degraded.

Accordingly, the inventors herein have recognized a need for a battery cell interconnect and voltage sensing assembly that minimizes and/or eliminates the above-mentioned deficiency.

SUMMARY OF THE INVENTION

A battery cell interconnect and voltage sensing assembly in accordance with an exemplary embodiment is provided. The battery cell interconnect and voltage sensing assembly includes a frame member having a first and a second side. The frame member further includes first, second, and third panel members, first and second end members, and first and second mounting members. The first, second, and third panel members are substantially parallel to one another and are spaced apart from one another. The second panel member is disposed between the first and third panel members. The first end member is coupled to a first end of the first, second, and third panel members. The second end member is coupled to a second end of the first, second, and third panel members. The first mounting member is coupled between the first and second panel members. The second mounting member is coupled between the second and third panel members. The battery cell interconnect and voltage sensing assembly further includes a first electrical interconnect member coupled to the first mounting member between the first and second panel members. The battery cell interconnect and voltage sensing assembly further includes a second electrical interconnect member coupled to the second mounting member between the second and third panel members. The first electrical interconnect member is configured to contact a first electrical terminal of a first battery cell. The second electrical interconnect member is configured to contact a second electrical terminal of the first battery cell. The second electrical interconnect is further configured to contact a third electrical terminal of a second battery cell, such that the first and second electrical interconnect members electrically couple the first battery cell to the second battery cell. The battery cell interconnect and voltage sensing assembly further includes a circuit board disposed on the first side of the frame member on the second panel member. The battery cell interconnect and voltage sensing assembly further includes an electrical connector disposed on the circuit board. The circuit board has a first electrical trace extending between the electrical connector and the first electrical interconnect member for sensing a voltage of the first electrical interconnect member.

A method for coupling a battery cell to a battery cell interconnect and voltage sensing assembly in accordance with another exemplary embodiment is provided. The battery cell interconnect and voltage sensing assembly includes a frame member with first, second, and third panel members, first and second end members, and first and second mounting members. The first, second, and third panel members are substantially parallel to one another and are spaced apart from one another. The second panel member is disposed between the first and third panel members. The first end member is coupled to a first end of the first, second, and third panel members. The second end member is coupled to a second end of the first, second, and third panel members. The first mounting member is coupled between the first and second panel members. The second mounting member is coupled between the second and third panel members. That battery cell interconnect and voltage sensing assembly further includes first and second electrical interconnect members disposed on the first and second mounting members, respectively. The method includes disposing a first electrical terminal of the battery cell through a space between the first and second panel members such that the first electrical terminal is adjacent to the first electrical interconnect member. The method further includes disposing a second electrical terminal of the battery cell through a space between the second and third panel members such that the second electrical terminal is adjacent to the second electrical interconnect member. The method further includes ultrasonically welding the first electrical terminal to the first electrical interconnect member. The method further includes ultrasonically welding the second electrical terminal to the second electrical interconnect member.

DETAILED DESCRIPTION OF AN EXEMPLARY EMBODIMENT

Figure 1:
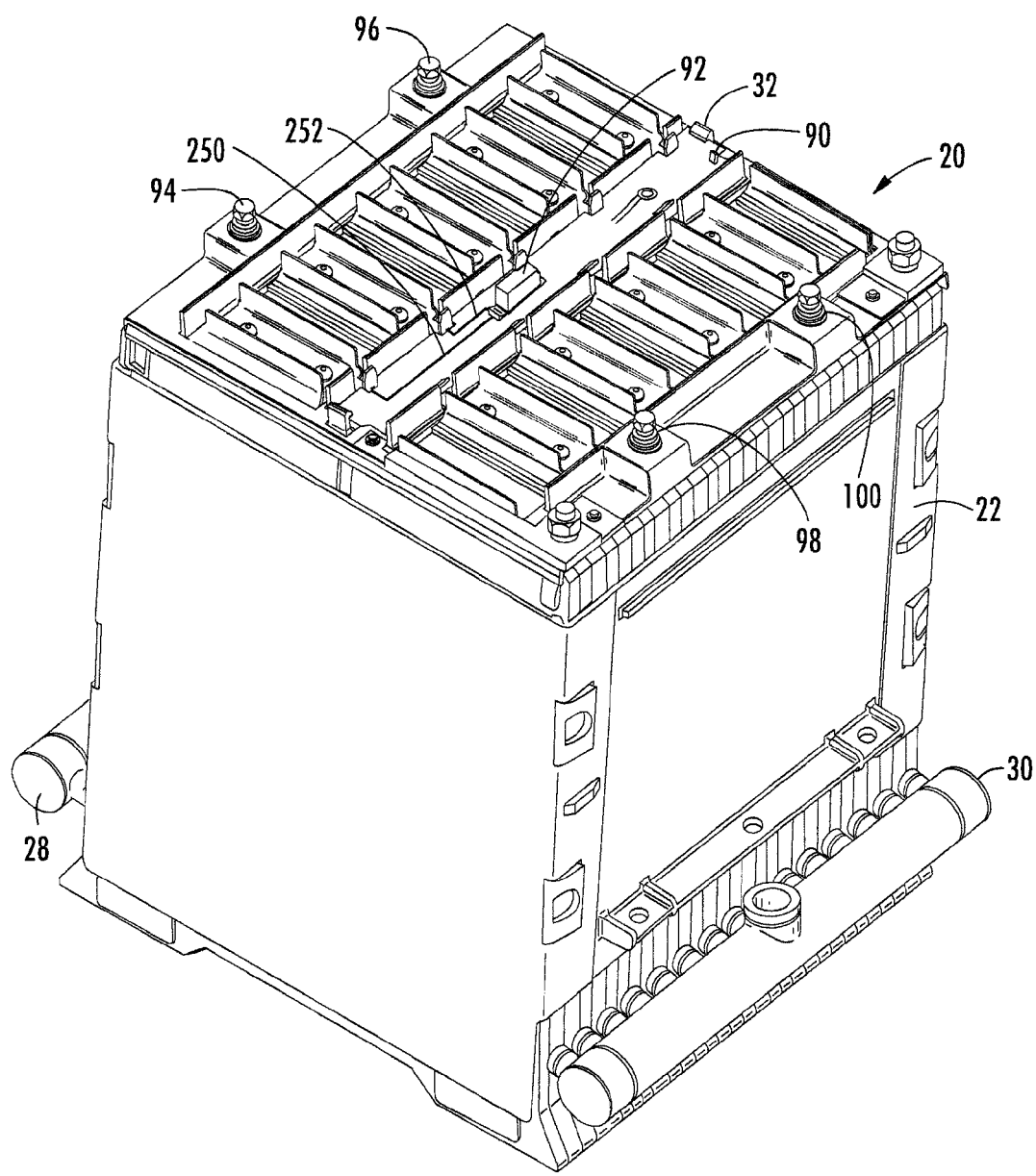
FIG. 1 is a schematic of a battery module in accordance with an exemplary embodiment.
Figure 2:
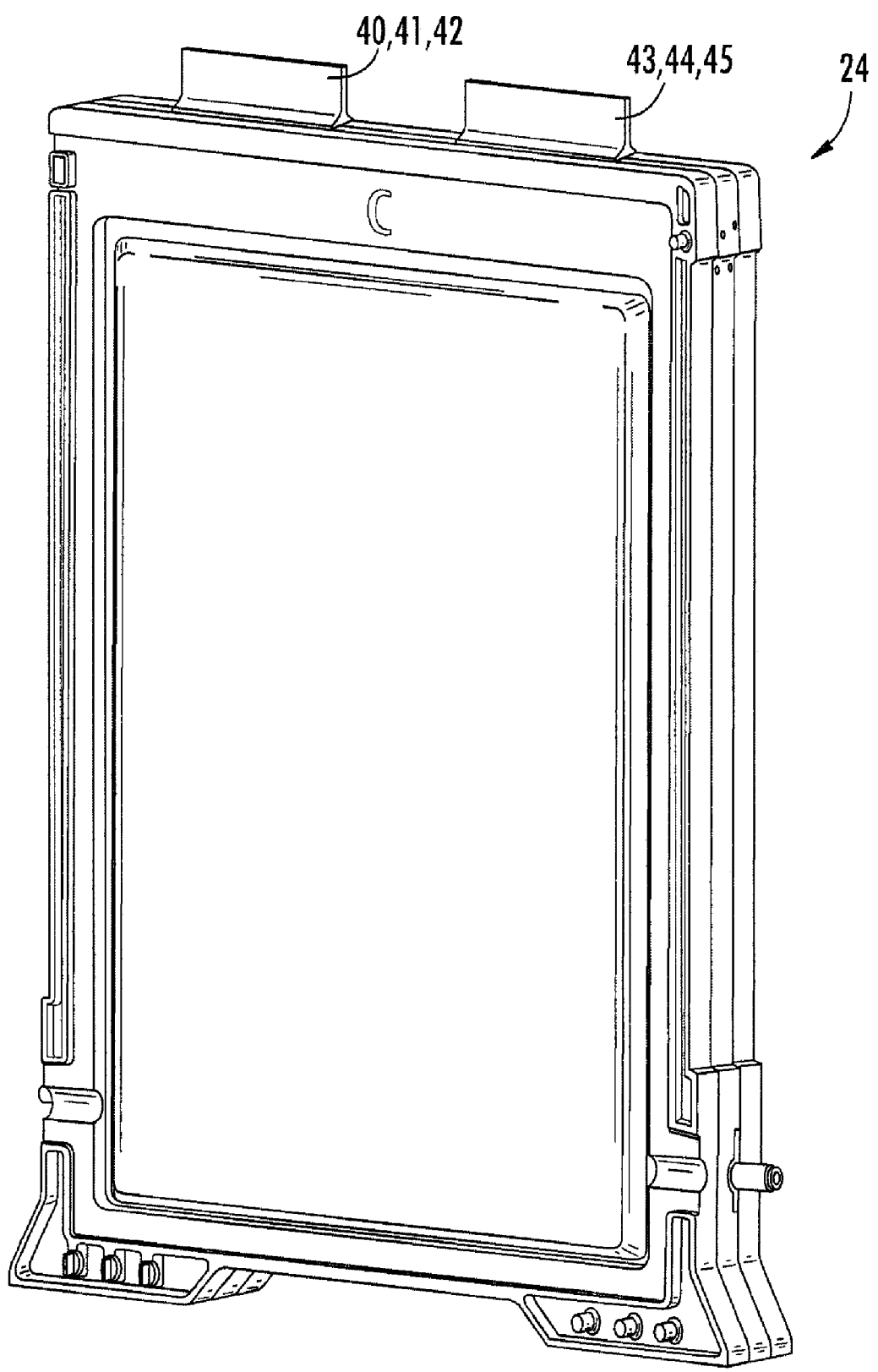
FIG. 2 is a schematic of a battery cell assembly utilized in the battery module of FIG. 1.
Figure 3:
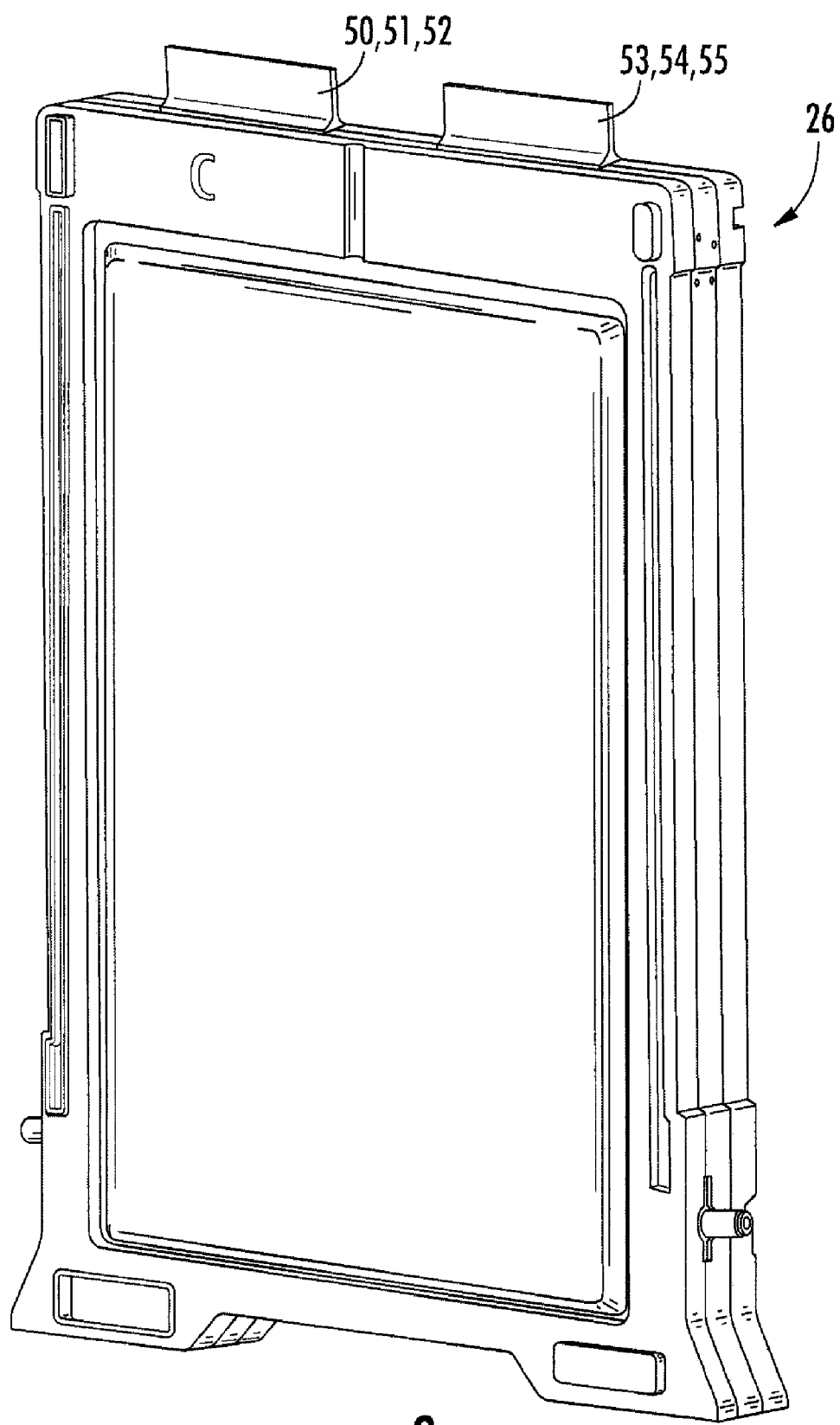
FIG. 3 is a schematic of another battery cell assembly utilized in the battery module of FIG. 1.

Referring to FIGS. 1, 2 and 3, a battery module 20 for providing electrical power is illustrated. The battery module 20 includes an outer housing 22, battery cell assemblies including battery cell assemblies 24, 26, cooling manifolds 28, 30 and a battery cell interconnect and voltage sensing assembly 32. An advantage of the battery cell interconnect and voltage sensing assembly 32 is that the assembly 32 has both (i) electrical interconnect members that support battery cell assembly electrical terminals and route electrical current from the battery cell assembly electrical terminals and (ii) electrical traces electrically coupled to the electrical interconnect members which allow voltages on the electrical interconnect members to be sensed. A battery cell assembly is defined as a housing having at least one battery cell therein.

Figure 9:
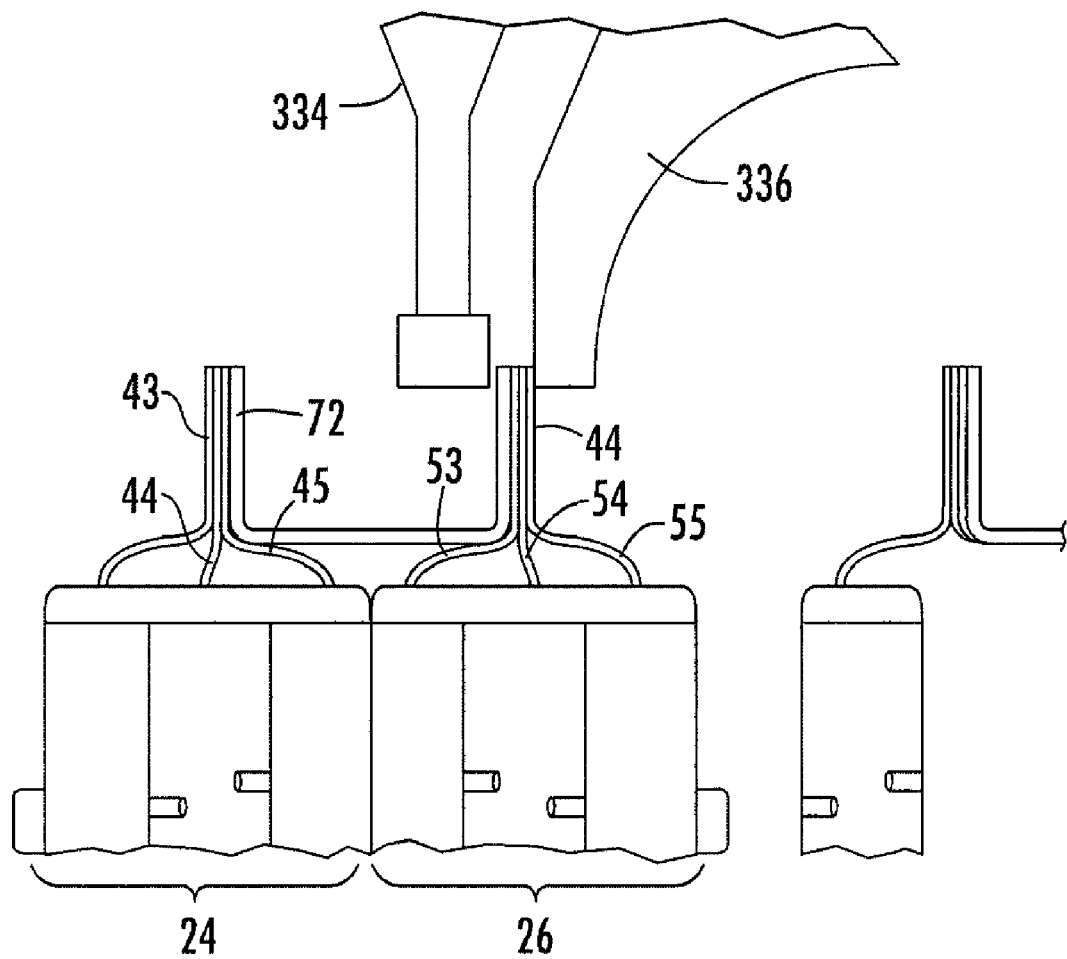
FIG. 9 is a schematic of two battery cell assemblies electrically coupled to an electrical interconnect member of FIG. 5.

The outer housing 22 encloses the battery cell assemblies including a battery cell assemblies 24, 26 and heat exchangers (not shown) therein. The battery cell assemblies 24, 26 each have one or more battery cells therein producing an output voltage and current. Referring to FIGS. 2 and 9, in one exemplary embodiment, the battery cell assembly 24 has three battery cells therein having positive electrical terminals 43, 44, 45 and negative terminals 40, 41, 42. Further, the battery cell assembly 26 has three battery cells therein having negative electrical terminals 53, 54, 55 and positive terminals 50, 51, 52. In one exemplary embodiment, the battery cells in the battery cell assemblies 24, 26 are lithium-ion battery cells.

Referring to FIG. 1, the cooling manifold 24 is configured to route a fluid from a fluid reservoir (not shown) to heat exchangers (not shown) in the battery cell assemblies for cooling the battery cell assemblies. The cooling manifold 26 is configured to receive the heated fluid from the heat exchangers and to route the fluid to the fluid reservoir.

Referring to FIGS. 1, 4, 7 and 8, the battery cell interconnect and voltage sensing assembly 32 includes a frame member 60, electrical interconnect members 62, 64, 66, 68, 70, 72, 74, 76, 78, a circuit board 90, an electrical connector 92, and bolts 94, 96, 98, 100. The assembly 32 is provided to electrically couple battery cell assemblies in a desired electrical configuration and to provide electrical traces and an electrical connector for sensing voltages of the battery cell assemblies.

The frame member 60 has a side 101 and an opposite side 102. In one exemplary embodiment, the frame member 60 is constructed from plastic. Of course, in alternative embodiments, the frame member 60 can be constructed from other materials such as metals or ceramics. The frame member 60 includes panel members 110, 112, 114, end members 120, 122, and mounting members 123, 124, 125, 126, 127, 128, 129, 130, 131. The panel members 110, 112, 114 are substantially parallel to one another and are spaced apart from one another. The panel member 112 is disposed between the panel members 110, 114. The end member 120 is coupled to a first end of the panel members 110, 112, 114. Further, the end member 122 is coupled to a second end of the panel members 110, 112, 114.

Figure 4:
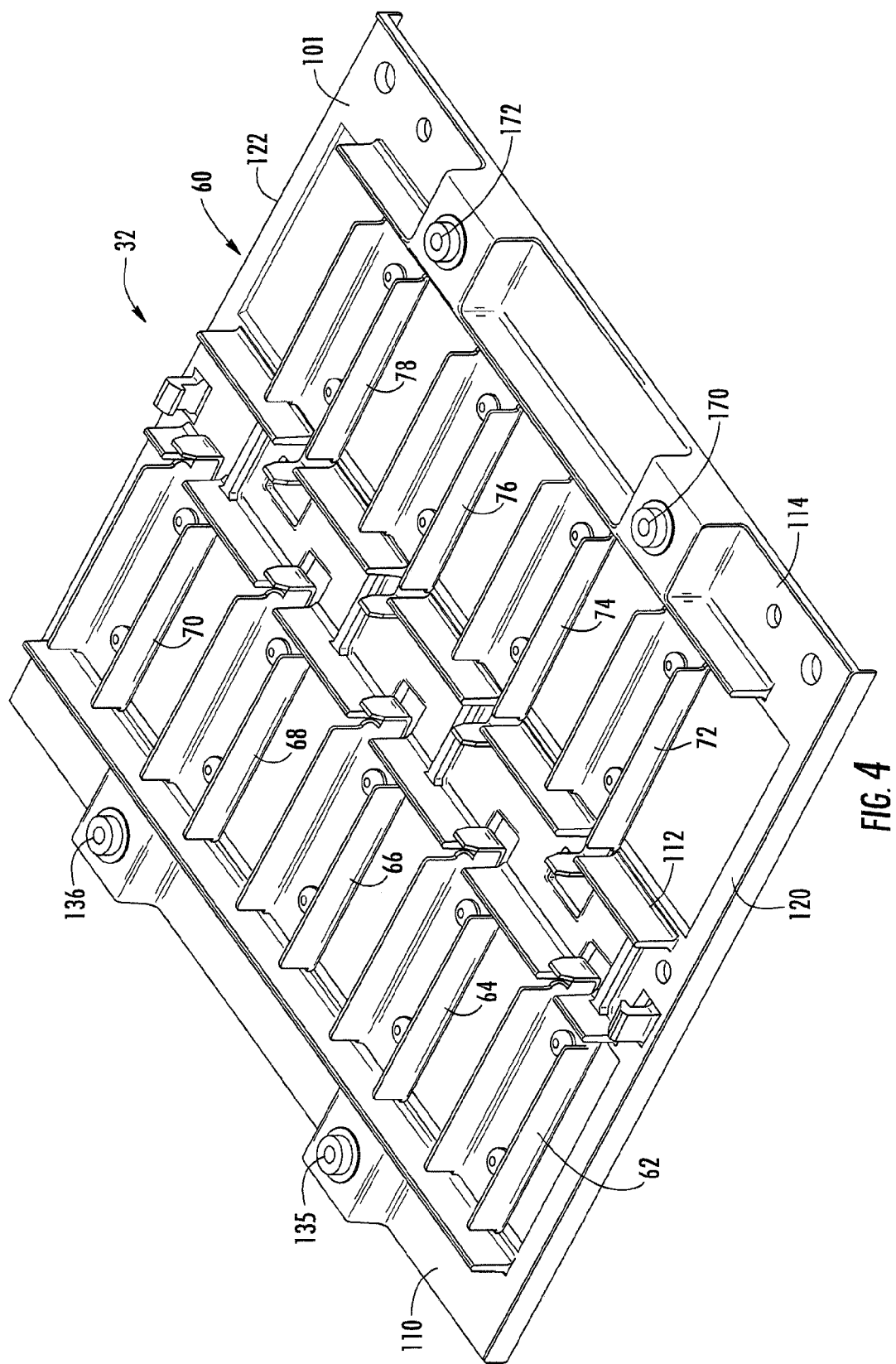
FIG. 4 is a schematic of a battery cell interconnect and voltage sensing assembly utilized in the battery module of FIG. 1.

Referring to the FIGS. 1 and 4, the panel member 110 includes apertures 135, 136 extending therethrough. Bolts 94, 96 extend through the apertures 135, 136, respectively, for mounting the battery cell interconnect and voltage sensing assembly 30 to the battery cell assemblies.

Figure 7:
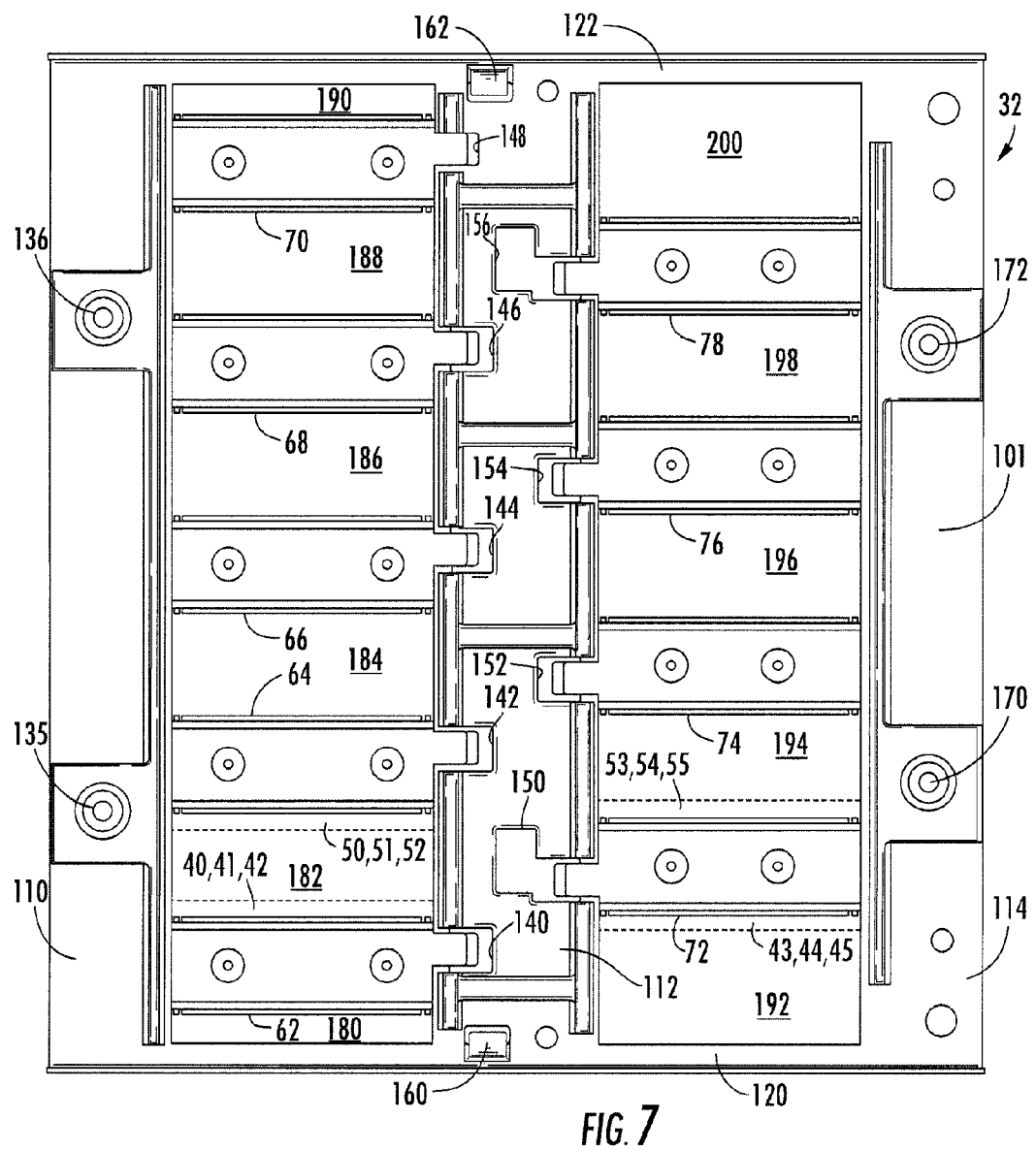
FIG. 7 is a schematic of a top side of the battery cell interconnect and voltage sensing assembly of FIG. 4.

Referring to FIGS. 1 and 7, the panel member 112 is provided to hold the circuit board 90 thereon. The panel member 112 includes tab members 160, 162 extending from the side 101 that hold the circuit board 90 therebetween. The panel member 112 further includes apertures 140, 142, 144, 146, 148, 150, 152, 154, 156 extending therethrough for receiving tabs of the electrical interconnect members 62, 64, 66, 68, 70, 72, 74, 76, 78, respectively, therethrough.

Referring to FIGS. 1 and 4, the panel member 114 includes apertures 170, 172 extending therethrough. Bolts 98, 100 extend through the apertures 170, 172, respectively, for mounting the battery cell interconnect and voltage sensing assembly 30 to the battery cell assemblies.

Figure 8:
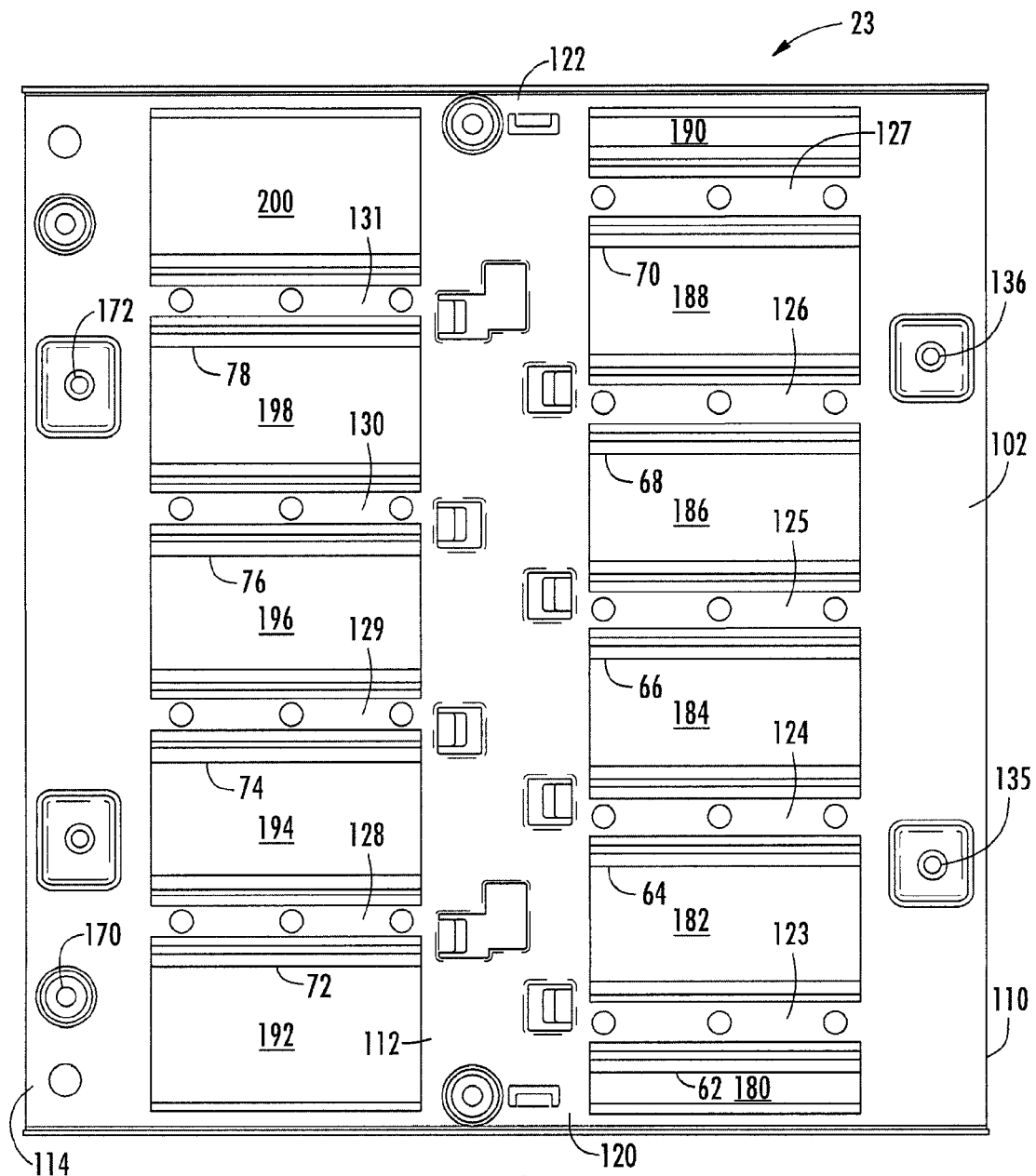
FIG. 8 is a schematic of a bottom side of the battery cell interconnect and voltage sensing assembly of FIG. 4.

Referring to FIG. 8, the mounting members 123, 124, 125, 126, 127 are coupled between the panel members 110, 112. A space 180 is defined between the mounting member 123 and the end member 120. A space 182 is defined between the mounting members 123, 124. A space 184 is defined between the mounting members 124, 145. A space 186 is defined between mounting members 125, 126. A space 188 is defined between the mounting members 126, 127. A space 190 is defined between the mounting member 127 and the end member 122. A space 192 is defined between the end member 120 and the mounting member 128. A space 194 is defined between the mounting members 128, 129. A space 196 is defined between the mounting members 129, 130. A space 198 is defined between the mounting members 130, 131. Finally, a space 200 is defined between the mounting member 131 and the end member 122.

Referring to FIGS. 4, 7 and 8, the electrical interconnect members 62, 64, 66, 68, 70, 72, 74, 76, 78 are configured to be coupled to the frame member 60. In particular, the electrical interconnect members 62, 64, 66, 68, 70, 72, 74, 76, 78 are coupled to the mounting members 123, 124, 125, 126, 127, 128, 129, 130, 131, respectively, of the frame member 60. In an exemplary embodiment, the electrical interconnect members 62, 64, 66, 68, 70, 72, 74, 76, 78 are constructed from copper or a nickel-plated copper. However, in alternative embodiments, other electrically conducting materials can be utilized to construct the electrical interconnect members 62, 64, 66, 68, 70, 72, 74, 76, 78. Each of the electrical interconnect members 62, 64, 66, 68, 70, 72, 74, 76, 78 are further configured to be coupled between electrical terminals from a first battery cell assembly and another battery cell assembly for routing electrical current from the first battery cell assembly to the another battery cell assembly. It should be noted that the number of electrical interconnect members can vary based upon a desired number of battery cell assemblies.

Figure 5:
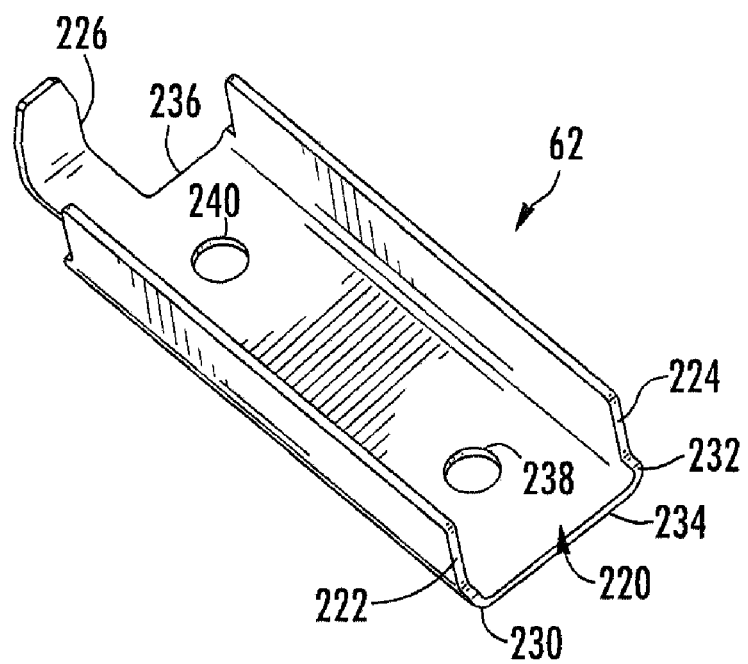
FIG. 5 is a schematic of an electrical interconnect member utilized in the battery cell interconnect and voltage sensing assembly of FIG. 4.
Figure 6:
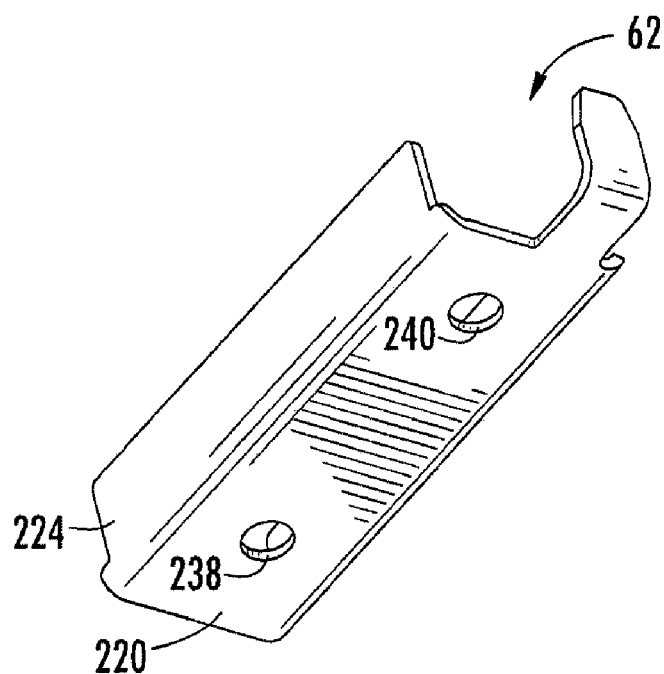
FIG. 6 is another schematic of the electrical interconnect member of FIG. 5.

Referring to FIGS. 4, 5, and 6, the electrical interconnect member 62 includes a rectangular plate 220, side walls 222, 224, and a tab 226. A bottom surface of the rectangular plate 220 is disposed on the side 101 of the frame member 60. The rectangular plate 220 includes edges 230, 232 disposed substantially parallel to one another and edges 234, 236 disposed substantially parallel to one another. The side walls 222, 224 extend from the edges 230, 232, respectively, outwardly from the rectangular plate 220 in a first direction. The tab 226 extends from the edge 236 generally in the first direction. The structure of the electrical interconnect members 64, 66, 68, 70, 72, 74, 76, 78 and 80 are identical to the structure of the electrical interconnect member 62.

Referring to FIGS. 1 and 4, the circuit board 90 is disposed on the panel member 120, on the side 101 of the frame member 60. The circuit board 90 includes a plurality of electrical traces on a top surface thereof that extend from each tab of the electrical interconnect members 62, 64, 66, 68, 70, 72, 74, 76, 78 to respective pins in the electrical connector 92. For example, an electrical trace 250 can extend from a tab of the electrical interconnect member 62 to a respective pin in the electrical connector 92. Further, for example, an electrical trace 252 can extend from a tab of the electrical interconnect member 64 to a respective pin in the electrical connector 92. As shown, the electrical connector 92 is coupled to a top surface of the circuit board 90.

Referring to FIGS. 7 and 9, in one exemplary embodiment, a first side wall of the electrical interconnect member 72 is coupled to the electrical terminals 43, 44, 45 from the battery cell assembly 24 by ultrasonically welding the first side wall of the member 72 to the electrical terminals 43, 44, 45. Further, a second side wall of the electrical interconnect member 72 is coupled to the electrical terminals 53, 54, 55 of the battery cell assembly 26 by ultrasonically welding the second side wall of the member 72 to the electrical terminals 53, 54, 55. Further, the electrical interconnect member 62 is coupled to the electrical terminals 40, 41, 42 from the battery cell assembly 24 by ultrasonically welding a first side wall of member 62 to the electrical terminals 40, 41, 42. Further, a first side wall of the electrical interconnect member 64 is coupled to the electrical terminals 50, 51, 52 from the battery cell assembly 26 by ultrasonically welding the first side wall of the member 64 to the electrical terminals 50, 51, 52.

Referring to FIG. 7, for purposes of understanding, a brief explanation of how the battery interconnect and voltage sensing assembly 32 conducts electrical current from battery cell assemblies in accordance with an exemplary embodiment will now be explained. For purposes of simplicity, only a pair of electrical terminals (e.g., a positive electrical terminal and a negative electrical terminal) from a first battery cell assembly and a pair of electrical terminals (e.g., a positive electrical terminal and a negative electrical terminal) from a second battery cell assembly will be utilized for explaining how the assembly 32 can conduct an electrical current from battery cell assemblies. In particular, the battery cell assembly 28 has a negative electrical terminal 40 and a positive electrical terminal 43 coupled to the electrical interconnect members 62, 72, respectively. Further, the battery cell assembly 30 has a negative electrical terminal 53 and a positive electrical terminal 50 electrically coupled to the electrical interconnect members 72, 64, respectively. Thus, in one exemplary embodiment, an electrical current from the battery cell assemblies 24, 26 can flow in series through the electrical terminal 40, the battery cell assembly 24, the electrical terminal 43, the electrical interconnect member 72, the electrical terminal 53, the battery cell assembly 26, the electrical terminal 40, and the electrical interconnect member 64. In other words, in one exemplary embodiment, the electrical interconnect members 62, 72, 64 electrically couple the battery cell assemblies 24, 26 in series to one another.

Figure 10:
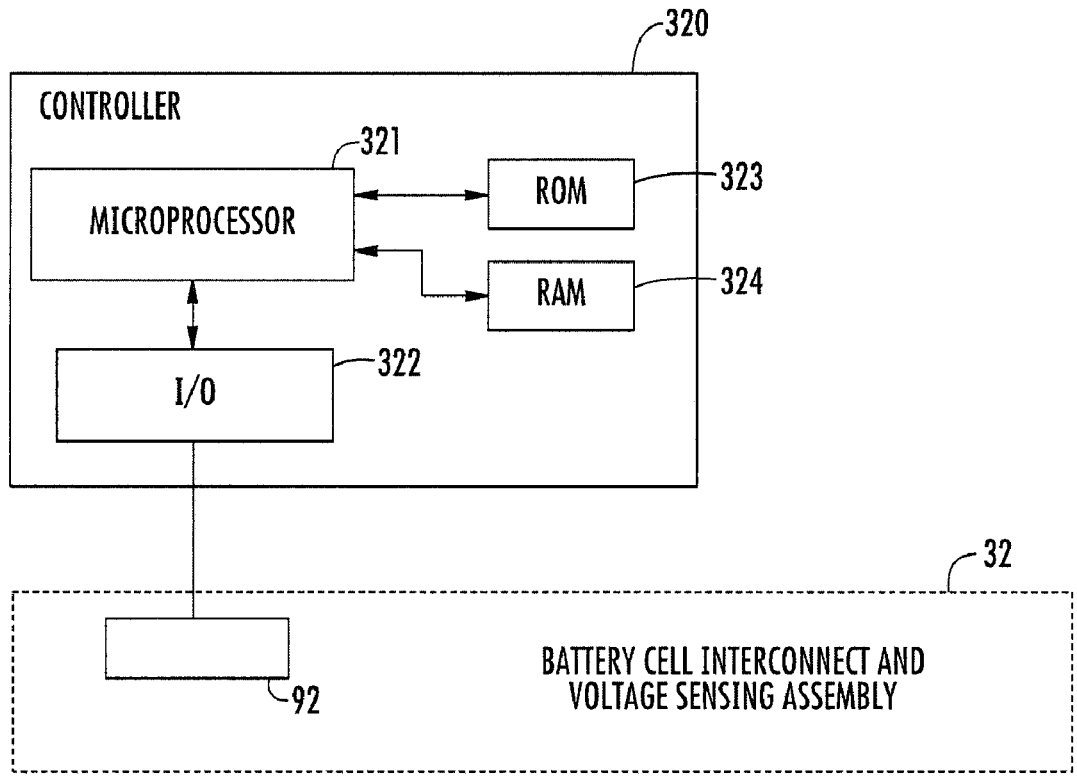
FIG. 10 is a schematic of a system for determining voltage values utilizing the battery cell interconnect and voltage sensing assembly of FIG. 4.

Referring to FIG. 10, the battery controller 320 is provided to determine the voltages associated with each of the electrical interconnect members which are indicative of the voltages being output by battery cell assemblies coupled to the electrical interconnect members. The controller 320 includes a microprocessor 321, an input/output (I/O) interface 322, a read-only memory 323, and a random access memory 324. The I/O interface 322, the read-only memory 323, and the random access memory 324 operably communicate with the microprocessor 321. The I/O interface 322 is electrically coupled to the electrical connector 92 of the battery cell interconnect and voltage sensing assembly 32. The microprocessor 321 executes instructions for sampling voltages received from the electrical interconnect members 62, 64, 66, 68, 70, 72, 74, 76, 78 via the electrical connector 92. The microprocessor 321 further determines voltage values associated with the electrical interconnect members 62, 64, 66, 68, 70, 72, 74, 76, 78 based on the received voltages from the electrical interconnect members 62, 64, 66, 68, 70, 72, 74, 76, 78, respectively. The microprocessor 321 further stores the voltage values in the random access memory 324 or in a non-volatile memory.

Figure 11:
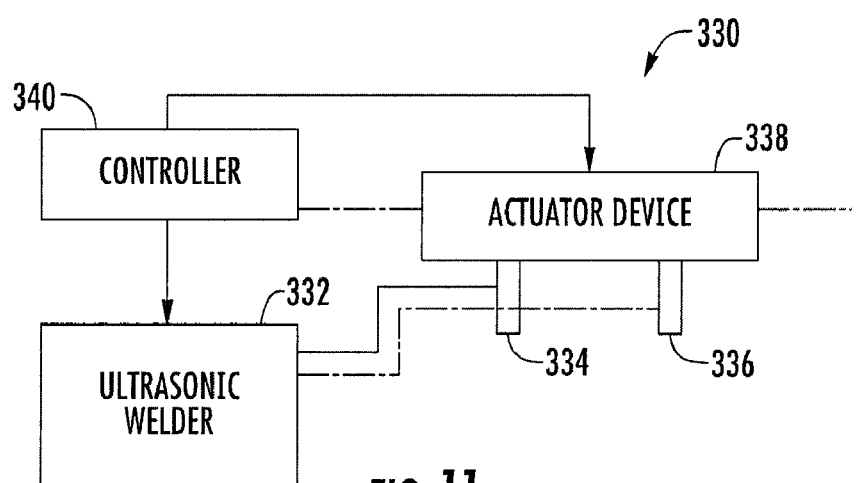
FIG. 11 is a schematic of an ultrasonic welding system for welding electrical terminals of a battery cell assembly to the battery cell interconnect and voltage sensing assembly of FIG. 4.

Referring to FIGS. 9 and 11, a system 330 for ultrasonically welding electrical terminals from battery cell assemblies to electrical interconnect members of the battery cell interconnect and voltage sensing assembly 32 is illustrated. The system 330 includes an ultrasonic welder 332, welding electrodes 334, 336, an actuator device 338, and a controller 340. The controller 340 operably communicates with the ultrasonic welder 332 and the actuator device 338.

Referring to FIGS. 2, 7 and 11, a method for coupling a battery cell assembly to the battery cell interconnect and voltage assembly 32 utilizing the system 330 will now be explained. For purposes of simplicity, ultrasonically welding two electrical terminals of a battery cell assembly to two electrical interconnect members of the assembly 32 will be described. However, it should be understood that a plurality of additional electrical terminals from the battery cell assembly could be welded to additional electrical interconnect members.

Initially, a user disposes the electrical terminal 40 of the battery cell assembly 24 through a space between the panel members 110, 112 such that the electrical terminal 40 is adjacent a side wall of the electrical interconnect member 62.

Next, the user disposes the electrical terminal 43 of the battery cell assembly 24 through a space between the panel members 112, 114 such that the electrical terminal 43 is adjacent a side wall of the electrical interconnect member 72.

Next, the controller 340 induces the actuator device 338 to move the welding electrode 334 proximate to the side wall of the electrical interconnect member 62, and to move the welding electrode 336 proximate to the electrical terminal 40 disposed adjacent to the side wall of the electrical interconnect member 62 such that the electrical terminal 40 and the side wall of the member 62 are sandwiched between the welding electrodes 334, 336.

Next, the controller 340 induces the ultrasonic welder 332 to ultrasonically weld the electrical terminal 40 to the side wall of the electrical interconnect member 62 utilizing the welding electrodes 334, 336.

Next, the controller 340 induces the actuator device 338 to move the welding electrode 334 proximate to the electrical terminal 43 disposed adjacent to a side wall of the electrical interconnect member 72 and to move the welding electrode 336 proximate to the side wall of the member 72 such that the electrical terminal 43 and the side wall of the electrical interconnect member 72 are sandwiched between the welding electrodes 334, 336.

Next, the controller 340 induces the ultrasonic welder 332 to ultrasonically weld the electrical terminal 43 to the side wall of the electrical interconnect member 72.

It should be noted that other types of welding processes, instead of an ultrasonic welding process could be utilized to couple a battery cell assembly to the battery cell interconnect and voltage assembly 32. For example, in an alternate embodiment, an electrical resistance welder could be utilized to weld electrical terminals of a battery cell assembly to the assembly 32. Further, for example, in another alternate embodiment, a laser welder could be utilized to weld electrical terminals of a battery cell assembly to the assembly 32.

The battery cell interconnect and voltage sensing assembly 32 provides a substantial advantage over other devices for coupling battery cells together. In particular, the assembly 32 provides a technical effect of supporting electrical terminals from battery cell assemblies utilizing electrical interconnect members on a frame member and routing electrical current from the battery cell assemblies utilizing the electrical interconnect members. Further, the assembly 32 routes voltage signals from the electrical interconnect members through electrical traces to an electrical connector to sense a voltage at each of the electrical interconnect members.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

We claim:

1. A battery cell interconnect and voltage sensing assembly, comprising:
    a frame member having a first and a second side, the frame member further having first, second, and third panel members, first and second end members, and first and second mounting members, the first, second, and third panel members being substantially parallel to one another and being spaced apart from one another, the second panel member being disposed between the first and third panel members, the first end member being coupled to a first end of the first, second, and third panel members, the second end member being coupled to a second end of the first, second, and third panel members, the first mounting member being coupled between the first and second panel members and further being disposed between and adjacent to first and second spaces defined between the first and second panel members, the second mounting member being coupled between the second and third panel members and further being disposed between and adjacent to third and fourth spaces defined between the second and third panel members;
    a first electrical interconnect member coupled to the first mounting member between the first and second panel members;
    a second electrical interconnect member coupled to the second mounting member between the second and third panel members;
    the first electrical interconnect member being configured to be welded to a first electrical terminal of a first battery cell, the first electrical terminal extending through the first space between the first and second panel members of the frame member such that the first electrical terminal extends above the frame member and is adjacent to the first electrical interconnect member, the second electrical interconnect member being configured to be welded to a second electrical terminal of the first battery cell that extends through the second space, the second electrical interconnect being further configured to be welded to a third electrical terminal of a second battery cell that extends through the third space, such that the first and second electrical interconnect members electrically couple the first battery cell to the second battery cell;
    a circuit board disposed on the first side of the frame member on the second panel member; and
    an electrical connector disposed on the circuit board, the circuit board having a first electrical trace extending between the electrical connector and the first electrical interconnect member for sensing a voltage of the first electrical interconnect member.

2. The battery cell interconnect and voltage sensing assembly of claim 1, wherein the circuit board further has a second electrical trace extending between the electrical connector and the second electrical interconnect member for sensing a voltage of the second electrical interconnect member.

3. The battery cell interconnect and voltage sensing assembly of claim 1, wherein the first electrical interconnect member has a first rectangular plate, first and second side walls, and a first tab, the first rectangular plate being coupled to the first mounting member, the first rectangular plate having first, second, third, and fourth edges, the first and second side walls extending from the first and second edges, respectively, upwardly from the first rectangular plate, the first tab extending from the third edge and through a portion of the circuit board, the first tab being electrically coupled to the first electrical trace.

4. The battery cell interconnect and voltage sensing assembly of claim 1, wherein the frame member is constructed from plastic.

5. A method for coupling a battery cell to a battery cell interconnect and voltage sensing assembly, the battery cell interconnect and voltage sensing assembly having
    a frame member with first, second, and third panel members, first and second end members, and first and second mounting members, the first, second, and third panel members being substantially parallel to one another and being spaced apart from one another, the second panel member being disposed between the first and third panel members, the first end member being coupled to a first end of the first, second, and third panel members, the second end member being coupled to a second end of the first, second, and third panel members, the first mounting member being coupled between the first and second panel members, the second mounting member being coupled between the second and third panel members, the battery cell interconnect and voltage sensing assembly further having first and second electrical interconnect members disposed on the first and second mounting members, respectively, the method comprising:
    disposing a first electrical terminal of the battery cell through a space between the first and second panel members of the frame member such that the first electrical terminal extends above the frame member and is adjacent to the first electrical interconnect member;
    disposing a second electrical terminal of the battery cell through a space between the second and third panel members of the frame member such that the second electrical terminal extends above the frame member and is adjacent to the second electrical interconnect member;
    ultrasonically welding the first electrical terminal to the first electrical interconnect member; and
    ultrasonically welding the second electrical terminal to the second electrical interconnect member.

* * * * *